United States Patent

[11] 3,550,739

| [72] | Inventor | Howard E. Wiltsey<br>Racine, Wis. |
|---|---|---|
| [21] | Appl. No. | 770,576 |
| [22] | Filed | Oct. 25, 1968 |
| [45] | Patented | Dec. 29, 1970 |
| [73] | Assignee | Eaton Yale & Towne Inc.<br>Cleveland, Ohio<br>a corporation of Ohio |

[54] FRICTION COUPLING
10 Claims, 3 Drawing Figs.

[52] U.S. Cl.............................................. 192/84,
29/182.5; 106/36; 192/107
[51] Int. Cl.......................................F16d 27/07,
F16d 13/60
[50] Field of Search.........................................
192/107(M), 84; 188/251(A), 251(M); 29/182.5;
106/36, 65

[56] References Cited
UNITED STATES PATENTS
3,003,588 10/1961 Huntress.....................192/107(M)(X)
3,221,853 12/1965 Batchelor et al.............192/107(M)(X)
3,294,496 12/1966 Berghezan.................... 29/182.5
3,326,343 6/1967 Stuckens et al............... 192/84(C)

*Primary Examiner*—Allan D. Herrmann
*Attorney*—Teagno & Toddy

ABSTRACT: The apparatus disclosed is an electromagnetic friction coupling which may be used for power transmission purposes. A driving member is frictionally engaged with a driven member in order to transmit a braking or driving torque upon energizing a field coil. The friction coupling includes a ceramic friction lining consisting of at least 90 percent aluminum oxide ($Al_2O_3$) and having a relative hardness on the MHO scale of at least 8. As a result of using this type of lining in an electromagnetic friction coupling or other frictional power transmission devices, the life of the lining is substantially improved and the coefficient of friction is substantially constant over a wide range of temperatures. Furthermore, the lining of this type is impervious to grease, oils and solvents and other lubricants whereby repeated performance of a high quality is ordinarily maintained under severe and in many cases less than ideal operational conditions.

PATENTED DEC 29 1970  3,550,739

INVENTOR
H. E. WILTSEY

BY  Teagno & Toddy
ATTORNEYS 3,550,739

1

FRICTION COUPLING

BACKGROUND OF INVENTION

This invention relates to friction couplings such as clutches and brakes for transmitting a driving or braking torque respectively.

Since couplings of the type disclosed are operated at high rates of speed and at high cycle rates, it is desirable to have a friction lining which is durable and long lasting. Since considerable heat is generated due to the frictional engagement of coupling members, it is also important that the coefficient of friction remain relatively constant over a wide range of temperatures.

Due to the frictional engagement of the coupling member, the friction material or lining wears resulting in a powder or granular type material being produced which may be referred to generally as wear contaminants. In order to overcome coupling deficiences and malfunctions, it is important to remove or extract substantially all of the wear contaminants from the coupling.

Previous couplings of this type have employed organic and inorganic materials as friction linings. However, such materials deteriorate with heat. For example, their coefficient of friction is substantially reduced as the temperature of the lining increases. In addition, the wear rate of these materials is extremely high compared to that used in the present invention. Such has caused the couplings to lose their torque transmission capacity and effectiveness at high operating temperatures and speeds. Also, expensive lining replacement costs have been encountered since the coupling must be taken out of production and disassembled in order to replace the lining.

SUMMARY OF INVENTION

Among the several objects of this invention is the provision of a friction coupling having a friction lining which is considerably harder than those previously used;

the provision of a friction coupling having a friction lining whose coefficient of friction is substantially uniform over a wide range of temperatures;

the provision of a friction coupling having a friction lining which is not affected by grease, oil or other solvents and lubricants;

the provision of a friction coupling having a friction lining which possesses low wear rate characteristics; and the provision of a friction coupling with means for removing the contaminants resulting from lining wear.

Other objects and features will be in part apparent and part pointed out hereinafter.

The term "coupling" as used herein includes apparatus wherein torque is transmitted between a pair of relatively rotatable members, whether it is either or both of the members which rotate. Examples of such devices are clutches, brakes and the like.

Briefly, a friction coupling according to the present invention includes a driving member and a driven member which are axially aligned and spaced from each other a certain distance when the coupling is in its decoupled condition. When torque transmission is desired, the driving and driven members become frictionally engaged to transmit a braking or driving torque. The coupling, according to this invention includes a friction lining which has a substantially longer life than that experienced in prior art couplings and whose coefficient of friction will remain relatively constant or uniform over a wide range of temperatures. In addition, the friction material will be substantially harder than prior art linings and substantially impervious to grease, oil and other solvents and lubricants.

The coupling, according to the present invention, will also include a means for extracting or removing contaminants generated from friction lining wear from the coupling so as to overcome defects and malfunctions in the coupling's operation caused by such contaminants.

2

DESCRIPTION OF THE PREFERRED EMBODIMENT

Figure 1:
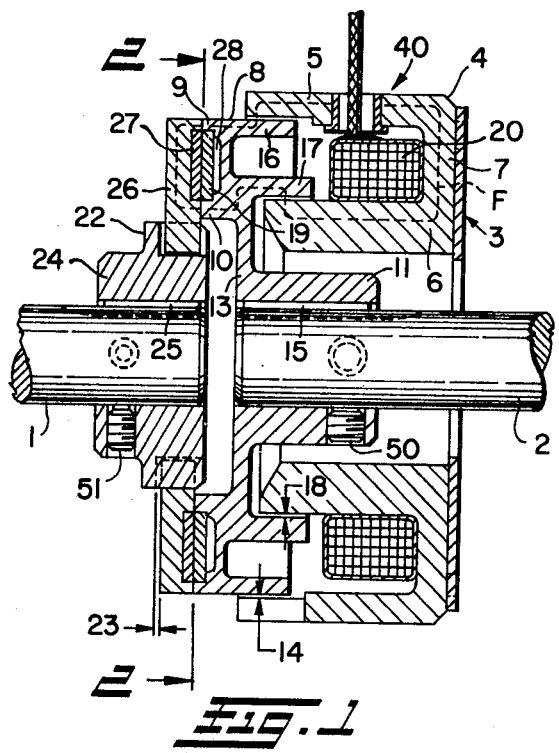
FIG. 1 is an axial section of a friction coupling illustrating the invention.

FIG. 1 shows an electromagnetic friction coupling 40 comprising in general an annular field member 4, an associated annular rotatable pole member 8 and an associated rotatable armature member 22.

The coupling 40 also includes a frame member 3 which is secured to the field member by fasteners such as bolts which are not shown. The frame member is then fastened to a housing.

The coupling further includes axially aligned relatively rotatable shafts 1 and 2, wherein shaft 2 is designated the driving shaft and shaft 1 the driven shaft. This is merely for exemplary purposes only and it will be readily understood that alternatively shaft 1 could be the driving shaft with shaft 2 the driven shaft.

The annular field member 4 which is stationary consists of magnetic material such as iron and is substantially U-shaped in cross section. The axial portions of this U-shaped cross section consists of an outer annular wall 5 and an inner annular wall 6. The inner and outer annular walls 5 and 6 respectively are joined by a radial end wall 7.

Associated with the field member 4 is an annular pole member 8 also made of magnetic material. Pole member 8 consists of an outer annular pole rim 9, an inner annular pole rim 10 and an annular hub portion 11 which is secured or fastened to the driving shaft 2 by means of a key member 15. Setscrews 50 are also used to securely fasten the hub member 11 to the shaft 2. Hub member 11 also includes a radially extending portion 13. Pole member 8 further includes an outer and inner wall 16 and 17 respectively. The outer and inner pole rims 9 and 10 respectively are designed so as to retain or accommodate a friction lining material 19 which is annular in configuration.

A driving armature member 22 is axially aligned adjacent the pole member 8 and is secured to a driven shaft 1 by means of a key member 25 and a plurality of setscrews 51. Armature member 22 also includes an annular armature ring 26 comprising magnetic material which is radially spaced from the shaft 1 and is supported by the hub member 24. The armature ring member 26 is loosely secured to hub member 18 and is capable of axially moving a distance equal to a gap 23 in a manner hereinafter described.

An annular friction lining 27 is disposed in armature ring 26 and axially aligned for mating with friction lining 19 of pole member 8.

The coupling further includes an annular field coil 20 which is disposed in the U-shaped cross section of field member 4 as shown in the drawing.

Field coil 20 is energized from a power supply of the type understood by those having ordinary skill in the art and which is commercially available. The friction linings 19 and 27 employed in the coupling 40 of FIG. 1 are ceramic material consisting of at least 90 percent aluminum oxide having a chemical formula $Al_2O_3$ and commonly referred to as alumina, which will be used interchangeably with aluminum oxide to describe this compound hereinafter.

It is readily understood that ceramic friction lining having a greater percentage of alumina ($Al_2O_3$) is also available under this invention.

Relative hardness tests conducted indicate that ceramic linings 19 and 27 have a rating of at least 8 on the MHO scale. Such friction lining is advantageous over prior art linings such as organic and inorganic materials since it has a substantial uniform coefficient of friction over a substantially wide temperature range. For example, tests conducted indicate that this material has a substantial stable coefficient friction over a temperature range of 0° to 1,300° F. Also, because of its relatively high degree of hardness, the friction material constituting this invention is substantially longer in life compared to prior art materials used in couplings of this type.

Friction couplings are normally run at relatively high rates of speed and at high cycle rates, thus generating substantial heat. As a result, it is extremely important that the coefficient of friction of the lining remain substantially constant or uniform over the working range of temperatures. Furthermore, in order to eliminate breakdown, down time and costly replacements for friction lining it is important that a material be used which has a relatively long life. These features are fulfilled by the lining covered by this invention. The ceramic friction lining of the present invention is also not affected by grease, oil or other solvents and lubricants, thus enabling the coupling to be cleaned and easily lubricated without worry of damage to the friction material and interferring with the operation and performance of the coupling.

Figure 2:
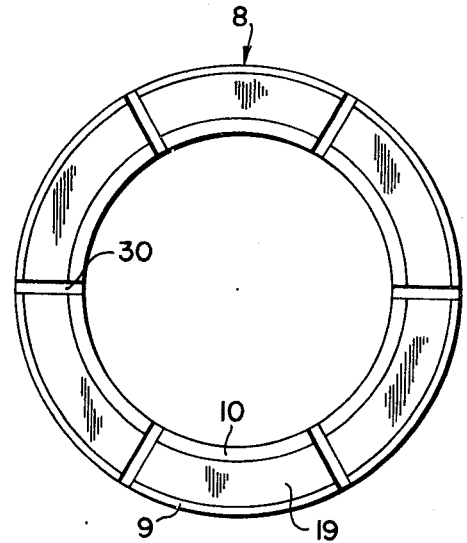
FIG. 2 is a front elevation of the pole portion of the friction coupling taken through lines 2—2 in FIG. 1.

FIG. 2 of the drawing shows a front elevation of the pole members 8 which includes the outer and inner pole rim members 9 and 10 and the annular ceramic friction lining 19. Radial grooves 30 are randomly disposed about the pole member to facilitate removal of wear contaminants which are generated as a result of the frictional engagement of the driving and driven members. In other words, the grooves 30 function to extract the wear contaminants which are normally in the form of a powder or fine granules caused by the frictional engagement of the armature and pole members 26 and 8 respectively. Such grooves eliminate the possibility of coupling failure due to wear contaminants which may enter into the magnetic circuit or into the bearing areas of the coupling causing overheating and clogging, as well as bearing destruction.

Operation of the coupling in FIG. 1 will now be described.

A prime mover such as an AC induction motor (not shown) drives shaft 2 at a uniform speed. When the field coil 20 is deenergized, the armature ring member 26 will be disengaged from the pole member 8 and displaced therefrom a distance equal to gap 23. In other words, the armature ring member 26 will be axially displaced from the pole member 8 a distance equal to the air gap 23. As a result, shafts 1 and 2 are decoupled whereby no torque is applied to shaft 1. When it is desired to transmit a driving torque, the field coil 20 is energized. As a result, a magnetic flux is generated having a path F which travels through the outer annular wall 5 of the field member 4, across a gap 14 into the outer wall 16 of pole member 8, through pole rim 9, across gap 23 and into armature ring member 26, out of armature ring 26, across air gap 23 and into the inner annular pole rim 10, inner pole wall 17, across gap 18 and into inner wall 6 of field member 4 and radial end wall 7. As a result, a magnetic force is created causing the armature ring member 26 to become magnetically attracted to the pole member 8 whereby the friction linings 19 and 27 are engaged and operate to transmit a driving torque to shaft 1. A high reluctance piece 28 radially separating the outer and inner walls 16 and 17 of the pole member 8 operates to block the flux from short circuiting through this area which would cause the coupling to become inoperative or substantially reduce its torque transmission ability.

Figure 3:
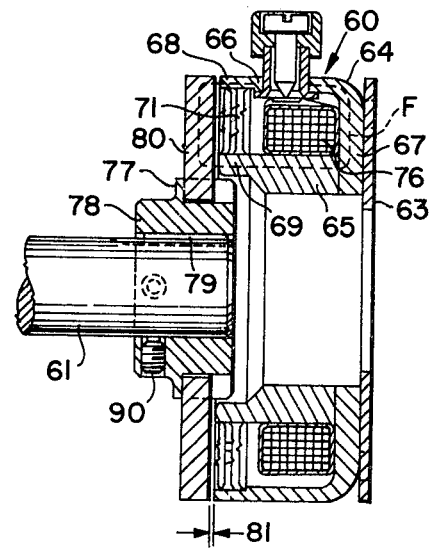
FIG. 3 is an axial section of friction coupling showing another embodiment of the invention.

FIG. 3 discloses an alternative embodiment of the invention comprising an electromagnetic friction brake 60 which includes a frame member 63 affixed to a housing by means of fasteners such as bolts not disclosed in the drawing. Frame 63 is then bolted or fastened to annular field member 64 which is U-shaped in cross section and comprises an inner annular wall 65 and an outer annular wall 66 which are joined by a radial end wall 67. Field member 64 including the aforementioned members 65, 66 and 67 are made of magnetic material such as iron. At one axial extremity of the outer and inner annular walls 66 and 65 are annular pole rim members 68 and 69 respectively. Disposed between said pole members is friction lining 71. An associated armature member 77 including a hub 78 which is secured to a rotatable shaft 61 by means of a key member 79 and set screws 90 is axially spaced from and aligned with the stationary field member 64. The armature hub 78 is loosely secured to an annular armature ring member 80. Armature ring member 80 comprises a magnetic material such as magnetic stainless steel, silicon steel, cast iron, various types and grades of carbon steels or combinations of various types of steels. For example, excellent results have been obtained when using an armature ring member 80 which consists of steel having between 1 percent and 5 percent silicon. An annular field coil 76 is disposed within the U-shaped cross section of field member 64.

The brake in FIG. 3 is shown in its disengaged condition where the armature ring 80 is displaced an axial distance equal to a gap 81 from the corresponding adjacent frictional surface of the field member 64.

The friction lining 71 is identical to the friction lining 19 and 27 described in connection with the coupling appearing in FIGS. 1 and 2. Operation of the brake in FIG. 3 will now be described.

With the field coil 76 deenergized, the shaft 61 which is driven by a prime mover or coupled to a driven load is permitted to rotate. Upon energizing coil 76, a magnetic circuit is completed whereby a flux F is generated which has a patch including the outer annular wall 66 of the field member 64, pole member 68, gap 81, armature ring member 80, gap 81, pole member 69, inner annular wall 65 and radial end wall 67. The magnetic force generated causes the armature member to become attracted and engaged with the friction lining and pole pieces of the field member 64. As a result, a braking torque is applied to the rotating shaft 61 causing it either to reduce its speed or stop completely whichever is desired. It is also understood that the radial slots or grooves 30 appearing in FIG. 2 for removing the wear contaminants of the friction lining are also available for the brake appearing in FIG. 3. When the field winding 76 is deenergized, the brake becomes disengaged and the armature member 80 moves axially away from the field member 64 and friction lining 71 a distance equal to air gap 81.

The invention thus contemplates two basic concepts. The first is disclosed in FIG. 1 wherein a ceramic type friction lining consisting of at least 90 percent aluminum oxide (alumina) $Al_2O_3$ and having a MHO's hardness of at least 8 is frictionally engaged with a material having the same characteristics. In other words, as shown in FIG. 1 of the drawing, the friction lining of the armature ring and the field member are of identical ceramic material.

The second alternative is shown in FIG. 3 where the ceramic frictional lining of the type described engages the metallic surface of the armature ring which may comprise of magnetic stainless steel, silicon steel, cast iron, various grades and types of carbon steels or combinations of various types of steels.

In the first instance, where the ceramic friction material is disposed in both the driving and driven members, repeatable performance and long life were obtained, while in the second alternative where ceramic friction material is disposed in only one of the driving or driven members, a high but stable torque over a wide thermal range was experienced but with a higher rate of wear than the first. Initial performance perimeters, of course, would dictate the combination which is to be used. Although electromagnetic friction couplings such as the clutch disclosed in FIGS. 1 and 2 and the brake shown in FIG. 3 are described as a type of coupling in which the friction lining constituting this invention is applicable, it is readily understood that other frictional couplings are also available. Other types of couplings include pneumatic, hydraulic or spring loaded devices which include a single friction lining or a plurality of friction linings and transmit torque through the frictional engagement of a driven and driving member. The couplings of the type shown in the drawings are thus for exemplary purposes only and are by no means intended to limit the scope of the invention.

In view of the above, it would be seen that the several objects of the invention are achieved and other advantageous results obtained. As various changes could be made in the above construction without departing from the scope of the invention, it is intended that all matter contained in the above description or shown in the accompanying drawing shall be interpreted as illustrative and not in a limiting sense.

I claim:

1. An electromagnetic friction coupling comprising two relatively rotatable members:

one of said members comprising a pole structure having a field coil associated therewith;

said other member comprising an armature;

a ceramic friction lining comprising aluminum oxide ($Al_2O_3$) having a hardness on the MHO's scale of at least 8 secured to one of said members;

means for energizing said field coil for frictionally engaging said members.

2. An electromagnetic friction coupling according to claim 1 wherein the armature member which frictionally engages said other member comprises magnetic stainless steel.

3. An electromagnetic friction coupling according to claim 1 wherein said friction lining is secured to said pole structures.

4. An electromagnetic friction coupling according to claim 3 wherein said pole structure includes a plurality of radial slots randomly disposed about the circumference of said lining for removing contaminants resulting from lining wear from the coupling.

5. An electromagnetic friction coupling according to claim 1 wherein said friction lining is secured to said armature member and said pole structure.

6. An electromagnetic friction coupling according to claim 1 wherein the armature member which frictionally engages said other member comprises steel which contains between 1 percent and 5 percent silicon.

7. A friction coupling comprising two relatively rotatable members, one of said members having a ceramic friction lining secured thereto, said friction lining comprising at least 90 percent aluminum oxide ($Al_2O_3$) having a hardness on the MHO's scale of at least 8, and means for frictionally engaging said members.

8. A friction coupling according to claim 7 wherein the surface of said other member which engages said friction lining of said one member comprises stainless steel.

9. A friction coupling according to claim 7 wherein said friction lining is secured to both of said members.

10. A friction coupling according to claim 7 wherein said member to which said friction lining is secured includes a plurality of radial slots randomly disposed about the circumference of said lining for removing contaminants resulting from lining wear from the coupling.